H. G. HOOPER.
FLYING MACHINE.
APPLICATION FILED AUG. 28, 1917.
1,397,761. Patented Nov. 22, 1921.
3 SHEETS—SHEET 1.
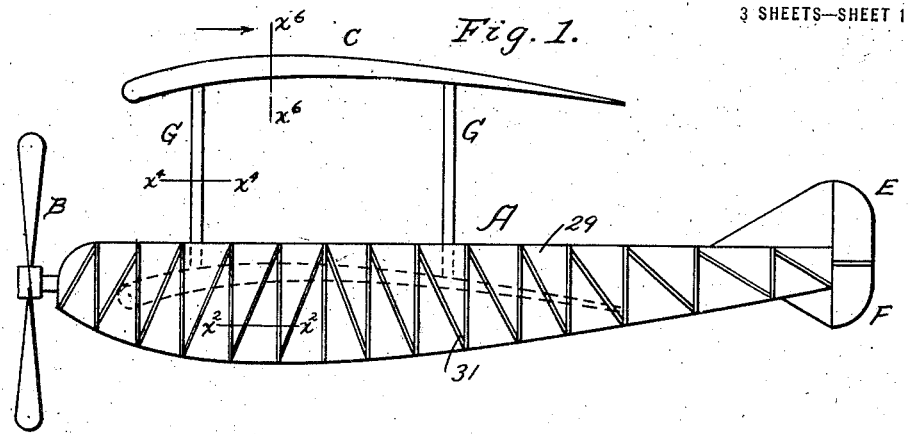
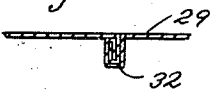
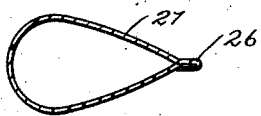
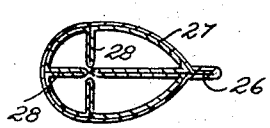
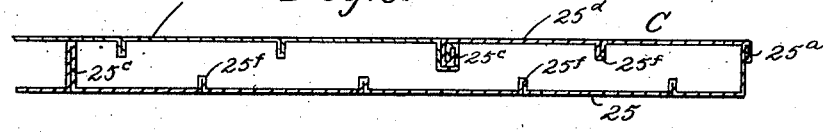
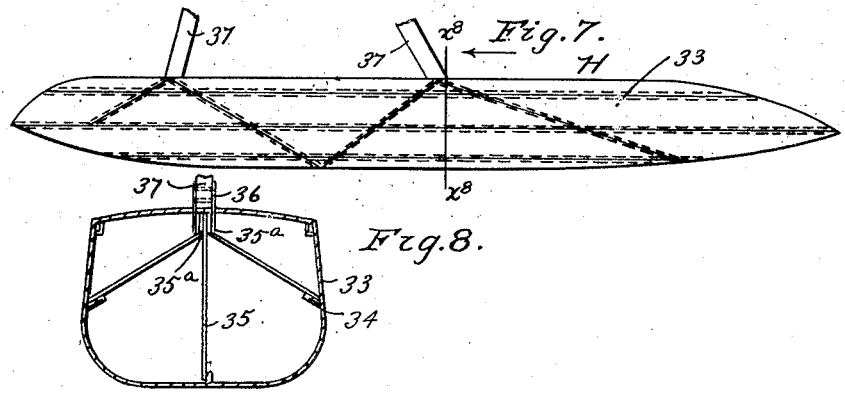
Witnesses,
H. Gearing.
J. Shutt
Inventor,
Harris G. Hooper,
By
His Attorney.

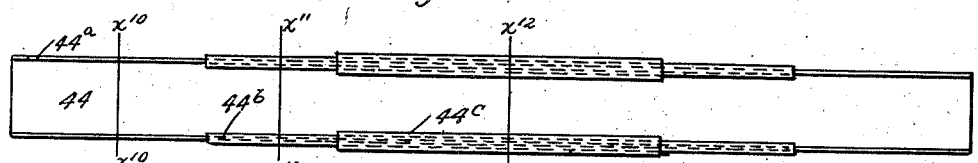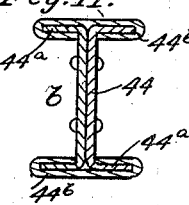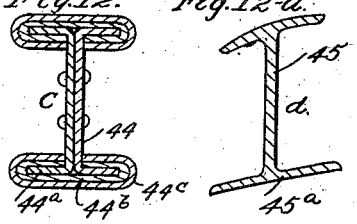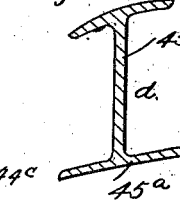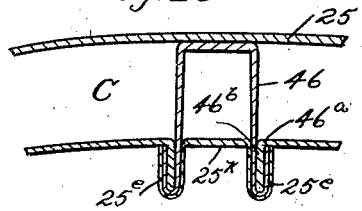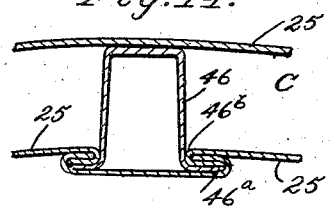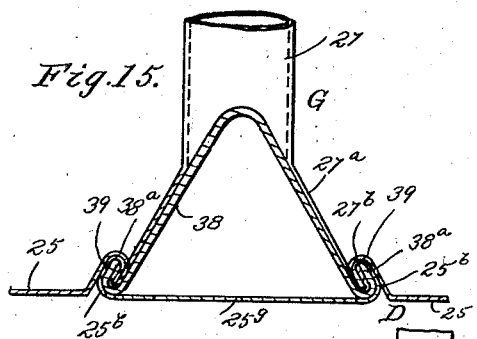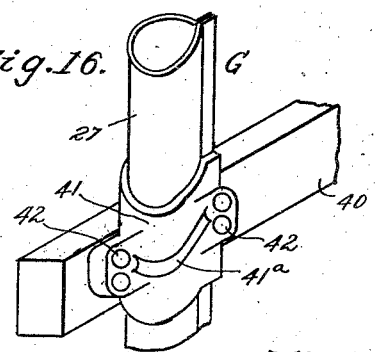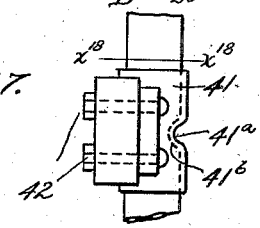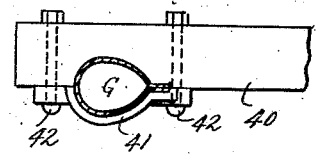

H. G. HOOPER.
FLYING MACHINE.
APPLICATION FILED AUG. 28, 1917.
1,397,761.
Patented Nov. 22, 1921.
3 SHEETS—SHEET 3.
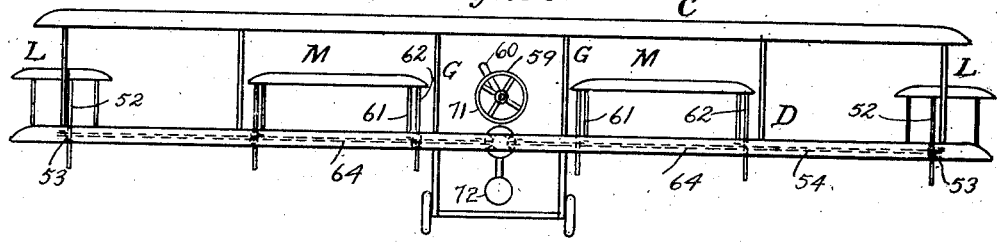
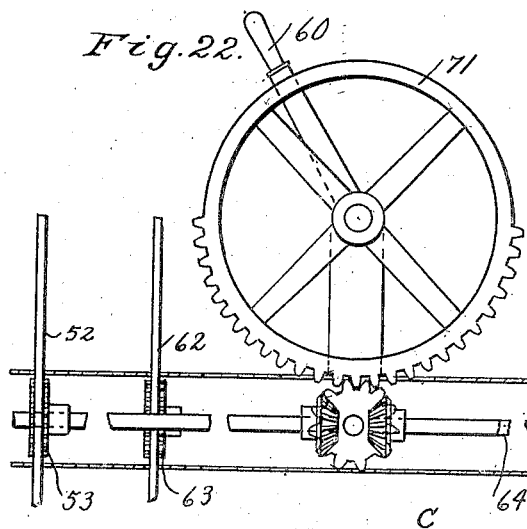
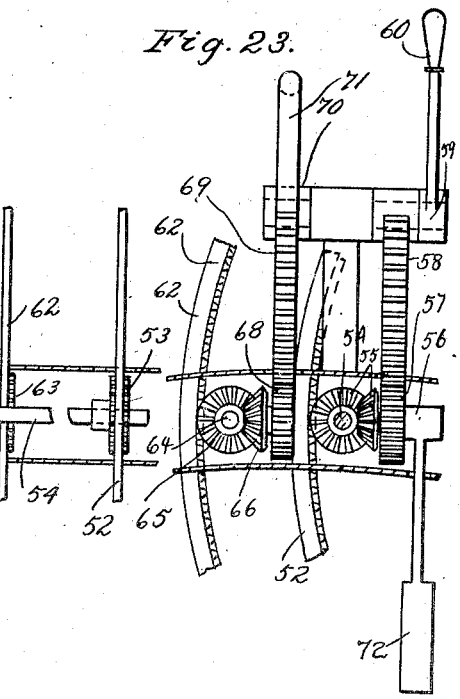
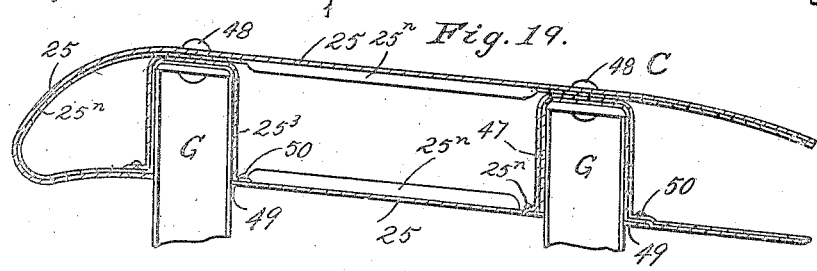
Witnesses,
H. Gearing.
J. Schutt
Inventor,
Harris G. Hooper;
By [signature]
His Attorney.

UNITED STATES PATENT OFFICE.

HARRIS G. HOOPER, OF LOS ANGELES, CALIFORNIA.

FLYING-MACHINE.

1,397,761.                    Specification of Letters Patent.     Patented Nov. 22, 1921.

Application filed August 28, 1917. Serial No. 188,623.

*To all whom it may concern:*

Be it known that I, HARRIS G. HOOPER, a citizen of the United States, residing at Los Angeles, in the county of Los Angeles and State of California, have invented new and useful Improvements in Flying-Machines, of which the following is a specification.

This invention relates to flying machines or more particularly heavier than air aeronautical vehicles, and it has for its object to provide improvements pertaining in the main to the sustaining surfaces and the bodies of such vehicles, machines or apparatus, and to means of connection or reinforcement for and between such features. The invention has for its further object the provision of improvements of the general nature stated which will be superior in point of relative simplicity and inexpensiveness of construction and organization taken in connection with, or considered in the light of, superiority in respect to durability, incombustibility, structural rigidity, stress-resistance, length of life, lightness and compactness of form, and facility of assemblage and security of interconnection and association and interrelation of parts and features, in addition to general efficiency and serviceability.

Still further objects are to provide sustaining means which is air tight or proof against passage of atmosphere, increasing the efficiency of the reactions of atmosphere impinging upon such means; also reducing the skin or surface friction, which advantage is translated into added horse power or saving in horse power. Distortion of surface and life of structure are insured by inherent stability.

With the above and other objects in view, the invention consists in the novel and useful provision, formation, construction, combination, association, interrelation and mode of assemblage and connection of parts, members and features, all as disclosed in the accompanying drawings, described in the following specification, and finally set out in claims.

In the drawings:

Figure 1 is a longitudinal median sectional view, taken through the chassis or body and sustaining surfaces of a flying machine constructed and organized to embody certain features of the invention;

Fig. 2 is a transverse detail sectional view taken upon the line $x^2$—$x^2$, Fig. 1, and looking downwardly;

Fig. 3 is a similar view of a modified form of construction;

Fig. 4 is a detail transverse sectional view taken upon the line $x^4$—$x^4$, Fig. 1;

Fig. 5 is a similar view of a modified form of construction;

Figs. 2, 3, 4 and 5 are upon an enlarged scale;

Fig. 6 is a detail transverse sectional view, upon an enlarged scale, taken upon the line $x^6$—$x^6$, Fig. 1;

Fig. 7 is a side elevation of a pontoon or flotation means adapted to be used in association with the construction shown in Fig. 1, or otherwise, parts being broken away for convenience of illustration;

Fig. 8 is a detail transverse sectional view of the same, taken upon the line $x^8$—$x^8$, Fig. 7;

Fig. 9 is a diagrammatic view illustrating the relative strengths or stress-resistance formations of girder elements built into or incorporated in the sustaining members shown in the other figures, such as 1 and 6;

Figs. 10, 11, 12 and 12$^a$ are end elevations of girders utilized in such sustaining member construction, and allocated with the corresponding zones related to varying stress-resistance, as depicted in Fig. 9;

Fig. 13 is a view of a modified form of sustaining member and girder formation, the same being in longitudinal section;

Fig. 14 is a similar view of a modification of structure with respect to the showing in Fig. 13;

Fig. 15 is a detail fragmentary view illustrating the seat or step provision for one of the struts whereby the sustaining members are held in spaced relation and connected;

Fig. 16 is a view of a modified form of construction or addition with respect to the disclosure in Fig. 1, providing for the placing of service loads upon the struts;

Fig. 17 is a vertical sectional view of the showing in Fig. 16;

Fig. 18 is a detail transverse sectional view taken upon the line $x^{18}$—$x^{18}$, Fig. 17;

Figs. 10 to 18 inclusive are likewise upon an enlarged scale;

Fig. 19 is a detail fragmentary longitudinal sectional view of a modified form of sustaining means construction, such as of the sustaining means C showing a continuous metallic sheet formation for both upper and lower walls of the plane developed into seats or recesses ranging transversely of the plane structure, in hollow girder form, and adapted to receive struts such as G;

Fig. 20 is a view of a modified form of construction including planes or sustaining means such as C and D, or otherwise produced in specific formation, and illustrating forms of control for producing both transverse and longitudinal equilibrium;

Fig. 21 is a detail end view of the construction shown in Fig. 20, parts being omitted.

Fig. 22 is an enlarged detail view of portions of the construction shown in Fig. 20; and Fig. 23 is an end view of the construction shown in Fig. 22.

Corresponding parts in all the figures are designated by the same reference characters.

Referring with particularity to the drawings, and more particularly to Figs. 1 to 6 thereof, A designates the body or chassis of a flying machine shown as provided with conventional means of propulsion B forward of the body to produce a tractor type of biplane of which C and D are the sustaining means or members or so-called planes; E designates the rudder or steering means and F designates elevating means or means for controlling longitudinal equilibrium or angularity of flight.

The sustaining means or planes C and D are preferably metallic and composite in construction, being formed of a plurality of jointed sections 25, although continuous metallic sheet formation may be employed if preferred or feasible. These sections are brought together at their edges in building up the plane, as at $25^a$, $25^b$ and $25^c$, both at side and front and rear edges, and the plane structure is produced with spaced upper and lower walls, $25^d$ and $25^e$ producing an interspace, and the whole is conformed to the proper curvature and given the proper camber, all in accordance with the approved design. The separate sections 25 are provided with transverse and preferred longitudinal reinforcing doubles or bends $25^f$, producing inherent rigidity in the plane structure. The outer surfaces of the walls of the plane structure are smooth and airtight, minimizing skin friction and producing a maximum of efficiency of the impinging air, and are likewise fireproof and have numerous other advantages as hereinabove recited. The sections 25 are so joined together, as at $25^a$ and $25^c$, as to provide such unbroken and practically continuous outer surfaces.

Between the planes extend the usual struts G shown in detail in Figs. 4 and 5. These struts are likewise preferably formed of sheet metal developed into the proper contours to provide a minimum effective head resistance, the vertical edges 26 of such sheets 27 being brought together at the rear of the structure and formed into a suitable lap joint. As shown in Fig. 5 such hollow or tubular metallic struts may be reinforced by introducing within the same one or more metallic formations 28, which effectively brace the strut against buckling or distortion in any direction.

The body A is likewise formed of one or more sheets 29 of metal suitably joined together and provided either with separate interiorly disposed reinforcing sheets 30 which are provided with bends, folds or doubles 31 to produce reinforcement, or such wall structural sheets 29 are in themselves looped or folded as at 32 to provide integral reinforcement; and such reinforcements 31 and 32 may have their extension in accordance with any preferred system of bracing to produce the requisite inherent rigidity of the body.

In Fig. 8 is shown a pontoon comprising a body H of suitable conformation likewise composed of one or more metallic sheets 33, such sheets when plurally provided being joined together as by interiorly disposed lap joints 34 providing smooth outer surfaces. Such pontoon body is interiorly braced or trussed, as at 35, and steps or sockets or seats 36 are provided for legs or connections 37 which at their upper ends are secured to or in connection with the body A, such seats, sockets or steps being built into the pontoon body construction and associated with the trusses or braces 35 therein, as by directing certain of said braces, as at $35^a$, upwardly into the same and anchoring the former to the latter. Suitable means, such as bolts or the like 37 are provided to secure the legs 37 in said seats or sockets.

Referring now more particularly to Fig. 15, a fragment of one of the planes D is shown as modified in its formation to accommodate and support a seat or step 38 for one of the struts G, one of the plates 25 of such plane being shown as transversely folded as at 39, in spaced relation, so as to receive the transversely bent up edges $38^a$ of the seat or step 38 which is formed of sheet metal produced into angular formation and upstanding from the plane of the metallic sheet 25. The strut G, or the tubular sheet metal body 27 thereof, is split and expanded at its lower end, as at $27^a$, to fit over such seat 38, and the edges thereof, as at $27^b$, are bent up and returned into the folded formation 39 of the plane 25 in association with the bent up edges $38^a$ of the seat or step 38. To complete the sustaining surface 25 at the open base of the angularly formed seat 38, a transverse section $25^g$ of sheet metal, is fitted in place and provided with bent up forward and rearward edges $25^h$ which likewise are received within the transverse folds or bends 39 of the plane sheet or surface sheet 25.

In Figs. 16 to 18 inclusive, one of the struts G is shown as supporting an engine or load bed member or beam 40 which is anchored to such strut by a sleeve or jacket 41 which envelops or embraces the strut G and is extended materially lengthwise thereof for effective engagement, and which jacket is bolted or otherwise secured to the beam 40, as at 42. The jacket 41 is provided with an inwardly directed rib $41^a$ which enters a complementary groove $41^b$ in the strut G and extending horizontally thereof. The close bind and fit of the jacket to and upon the strut G, when applied thereto and secured as at 42, together with the interengaging rib $41^a$ and groove $41^b$, insures an effective and positive anchorage of this engine or load bed beam 40, to safely and securely support the same.

Referring to Figs. 9 to 14, I have disclosed therein various sheet metal formations for tying together and inherently bracing and strengthening the planes C and D.

In Fig. 9 is diagrammatically shown varying degrees of stiffness and structural strength resulting from the formations shown in allocation therewith in Figs. 10 to $12^a$ inclusive. It will be understood that the several trusses $a$, $b$, $c$, and $d$, shown in the respective figures last mentioned are disposed between the upper and lower sheet metal walls 25 of the planes or sustaining members C and C, or that such walls enter into or are intimately associated with such truss formations.

In Fig. 10 the truss $a$ is shown as comprising a pair of joined or bolted channel iron metallic shapes 44, the flanges $44^a$ of which are presented to the surfaces of the plane structure.

In Fig. 11 the same composite construction is shown, in addition to which the edges of the flanges $44^a$ are returned against the webs of the channel irons, producing a strengthening of the composite formation.

In Fig 12 the same channel iron formation is provided, in addition to which sheets of metal $44^c$ are bent or folded to the flanges $44^a$ and brought up against the webs of the channel irons for reinforcement.

In Fig. $12^a$ is shown a truss in the nature of an I beam provided with a web 45 and flanges $45^a$ and $45^b$ which are angled to the web 45, and either one or both transversely curved, to cause the same to conform to curvatures or planes of extension of the surface sheets 25 of the plane.

In Fig 13 I show a truss comprising a metallic sheet 46 which is folded or developed into channel formation to extend transversely of the plane member or means or element C or D, the median portion thereof being brought to bear against the plate formation 25 of the upper wall, and the edge portions thereof being folded and brought into lap-joint engagement, as at $46^a$, with the bent or angled edges of the lower body plate or plates 25, as at $46^b$. To complete the gap in the plane surface or in or between the lower wall plate or plates $25^e$, a transverse plate section $25^k$ is fitted into place within the open mouth of the truss 46, and the forward and rearward edges $25^e$ thereof are looped about the edges $46^a$ and $46^b$, whereupon the lap joints so totally produced are deformed as shown in Fig. 14, and brought into flat relation with the lower plane wall, or sheet or sheets 25.

Referring with particularity to Fig. 19, the plane is shown as comprising a continuous metallic wall, as 25, which is folded or creased or plaited longitudinally at intervals, as at $25^n$. The lower wall 25 is arched upwardly into contact with the upper wall 25, to produce what may be termed hollow beams 47 which range transversely of the plane formation, and within which beam formations the plaits or folds $25^n$ are flattened to produce a strong reinforcement. Within these hollow beams are received the struts as G, suitably riveted or bolted into position at their upper ends, through the beam formations and through the upper plane walls 25, as at 48. The hollow beams 47 are closed at their bottoms, as at 49, surrounding the struts G, by filler plates which lie generally within the plane of the lower wall 25, and are bolted or riveted thereto, as at 50, to produce substantially uninterrupted extension of such lower wall. The plaits or folds $25^n$ may likewise be flattened out upon the plane surface or wall 25 as forwardly of the forward struts G, for more effective reinforcement of the plane structure at such zones thereof.

Referring now to Figs. 20 to 23 inclusive, I have shown therein a biplane construction with planes connected as by strut G, the same being provided with ailerons or stabilizing planes between the tips of the main planes, L. These planes are pivotally connected, by arms 51, with the lower main plane D, adjacent to the rearward struts G, and range forwardly of the figure of the biplane to lie at their forward terminal edges substantially in the vertical plane of the leading edges of the main planes. To operate such ailerons I provide arcuate racks 52 depending from the leading edges thereof, and meshing with pinions 53 upon transmission shafts 54 which range transversely of the machine forward of the lower plane, and are operated by meshing spur gears 55 upon such shafts and a short shaft 56 provided with a pinion 57 meshing with a toothed sector 58 fast upon an operating shaft 59 journaled at the central portion of the machine, and provided with an operating lever 60 for manually controlling or oppositely deflecting the ailerons L. Similarly I provide elevating planes M which are similarly pivotally mounted by arms 61 so as to be disposed at their leading edges substantially at the forward vertical plane of the planes C and D, the same being provided with accurate racks 62 which mesh with a pinion 63 carried by shafts 64 disposed forwardly of the shafts 54 and ranging transversely of the machine, such shafts 64 being operated by bevel pinions 65 meshing with a bevel pinion 66 upon a short shaft which is provided with a pinion 68. The pinion 68 meshes with a segment 69, carried by a sleeve 70 provided with a hand wheel 71 ranged forwardly of the hand lever 60. A pendulum 72 depends from the shaft 56 and exerts a tendency to keep the ailerons L in normally inert positions, such ailerons being of course oppositely actuated by operating the hand lever 60.

The operation and method of use and advantages of the various improvements in flying machine structure set forth in the foregoing description and shown in the drawings, will be readily understood from such description and drawings without further detail or cumulative statement.

It is manifest that I may make many variations and modifications and departures from or with respect to the subject-matter as specifically treated of in the foregoing description and drawings, without departing from the true spirit of the invention or the scope thereof.

Having thus disclosed my invention, I claim and desire to secure by Letters Patent:

1. A flying machine including a supporting plane having independent upper and lower surfaces formed of sheet metal, said surfaces presenting smooth exterior faces, while the opposed faces have integrally formed reinforcing ribs extending across the same.

2. A flying machine including a supporting plane having independent upper and lower surfaces formed of sheet metal, said surfaces presenting smooth exterior faces, while the opposed faces have integrally formed reinforcing ribs extending across the same; the ribs alternately projecting into the intermediate spaces between the surfaces.

3. A flying machine including a supporting plane having independent upper and lower surfaces formed of sheet metal, said surfaces presenting smooth exterior faces, while the opposed faces have integrally formed reinforcing ribs extending across the same; the ribs alternately projecting into the intermediate spaces between the surfaces; said ribs being formed by inwardly crimping said surfaces at intervals.

4. A flying machine including a supporting plane having independent upper and lower surfaces formed of sheet metal, said surfaces presenting smooth exterior faces, while the opposed faces have integrally formed reinforcing ribs extending across the same; the ribs alternately projecting into the intermediate spaces between the surfaces; said ribs being formed by inwardly crimping said surfaces at intervals, the crimps being tightly closed so that the outer faces of the sheet metal surfaces are smooth.

5. A flying machine including a supporting plane having spaced upper and lower surfaces formed of separate thicknesses of sheet metal, said sheet metal thicknesses being crimped at intervals to form inwardly projecting reinforcing ribs, certain of which span the space between the thicknesses and serve to hold the thicknesses in a properly spaced relation, said crimps being tightly closed so that the outer faces of the sheet metal thicknesses are smooth.

6. A flying machine including a supporting plane having independent upper and lower surfaces formed of sheet metal, said surfaces presenting smooth exterior faces, while the opposed faces have integrally formed reinforcing ribs.

In testimony whereof, I have signed my name to this specification in the presence of two subscribing witnesses.

HARRIS G. HOOPER.

Witnesses:
RAYMOND IVES BLAKESLEE,
J. SHUTT.